United States Patent [19]
Thompson, Jr.

[11] Patent Number: 5,833,276
[45] Date of Patent: Nov. 10, 1998

[54] CONDUIT DOUPLING

[75] Inventor: Ernest R. Thompson, Jr., Girard, Kans.

[73] Assignee: Etco Speciality Products, Inc., Girard, Kans.

[21] Appl. No.: 792,845

[22] Filed: Feb. 3, 1997

[51] Int. Cl.$^6$ ................................................ F16L 35/00
[52] U.S. Cl. ............................ 285/38; 285/55; 285/322; 285/351; 285/369; 285/383
[58] Field of Search ........................... 285/55, 322, 323, 285/369, 383, 38

[56] References Cited

U.S. PATENT DOCUMENTS

| | | | |
|---|---|---|---|
| 2,459,956 | 1/1949 | Muller | 285/322 |
| 3,248,135 | 4/1966 | Meripol | 285/323 |
| 4,657,286 | 4/1987 | Guest | 285/323 |
| 5,180,197 | 1/1993 | Thompson, Jr. | |
| 5,186,500 | 2/1993 | Folkers | 285/55 |
| 5,213,375 | 5/1993 | Wu | 285/38 |

FOREIGN PATENT DOCUMENTS

| | | | |
|---|---|---|---|
| 133670 | 3/1946 | Australia | 285/323 |
| 840489 | 6/1952 | Germany | 285/322 |

*Primary Examiner*—Dave W. Arola
*Attorney, Agent, or Firm*—Litman, McMahon & Brown L.L.C.

[57] ABSTRACT

A conduit coupling for conduit sections includes a body with a rigid, outer casing and an elastomeric inner core. The core includes a passage with annular ridges for sealing the coupling on the conduit. A pair of lock nuts are mounted on the casing ends and each receives a gripper ring with gripper ring ridges for engaging the conduit. The lock nuts are threadably mounted on the casing for tightening the gripper rings against the conduit sections to resist pull-out.

12 Claims, 5 Drawing Sheets

CONDUIT DOUPLING

BACKGROUND OF THE INVENTION

1. Field of the Invention

The present invention relates generally to conduit couplings, and in particular to a fluid-tight, pull-out resistant coupling for buried conduits for telecommunication lines and related applications.

2. Description of the Related Art

Various types of transmission lines and cables are commonly enclosed in conduits for protection. Such transmission lines can transmit electrical power or signals over, for example, electrical conductors or fiber optic cables. Conduits can be installed in various structures and can also be buried below grade. For example, fiber optic cables have come into widespread use in telecommunications, particularly in long distance telecommunication networks. Many of these fiber optic cables are being installed underground within protective conduits.

In fiber optic cable networks, the conduits can serve two purposes. First of all, fiber optic lines are often pulled through buried conduits by means of pulling devices driven by air pressure and connected to the fiber optic cable ends for pulling same through the buried conduits. Such installation methods can effectively install relatively long fiber optic cable runs. However, the buried conduits must be relatively fluid-tight to maintain the necessary air pressures over significant distances. Secondly, the conduits protect the fiber optic cable runs from the elements, such as ground water.

The conduit sections are commonly made of high density polyethylene (HDPE) for its properties of strength, impermeability, corrosion-resistance and moderate cost. Relatively permanent conduit runs can be formed with this material.

A common problem encountered in buried fiber optic cable network design relates to coupling the HDPE conduit sections. Strong, tight connections of the individual conduit sections are necessary to maintain the integrity of the system under adverse environmental conditions. Preferably the connections should be able to withstand internal air pressure encountered when the cables are installed and a tendency of the conduit section ends to pull away from the couplings.

The Thompson, Jr. U.S. Pat. No. 5,180,197 discloses a pipe jointing system with a rigid outer layer and an elastomeric inner layer. The elastomeric inner layer includes opposing sets of sawtooth ridges for engaging conduit section ends in sealing relationships therewith. However, the pipe jointing system of the Thompson, Jr. '197 patent lacks end-mounted lock nuts for securing the conduit section ends to the coupling and preventing pull-out of same.

Heretofore there has not been available a conduit coupling with the advantages and features of the present invention. The conduit coupling of the present invention addresses some of the problems encountered in installing buried fiber optic cable networks.

SUMMARY OF THE INVENTION

In the practice of the present invention, a coupling is provided for conduit sections. The coupling includes a body with an outer, rigid casing and an inner, resilient core. The core includes a plurality of annular ridges for engaging the conduit sections in sealing relationships. A pair of lock nuts are threadably mounted on the casing and each receives a gripper ring with annular ridges for engaging the conduit in a clamping relationship to resist pull-out.

OBJECTS AND ADVANTAGES OF THE INVENTION

The principle objects and advantages of the present invention include: providing a conduit coupling; providing such a conduit coupling which utilizes a rigid outer casing and an elastomeric core; providing such a conduit coupling with a pair of end-mounted lock nuts; providing such a conduit coupling with gripper rings received within the lock nuts; providing such a conduit coupling which is adapted for coupling a pair of conduit sections in a fluid-tight relationship; providing such a conduit coupling which is adapted to resist pull-out; providing such a conduit coupling which is particularly well adapted for use in connection with buried conduits; providing such a conduit coupling which is particularly well adapted for buried fiber optic cable networks; and providing such a conduit coupling which is economical to manufacture, efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 6 is a perspective view of a modified gripper ring thereof.

Detailed Description of the Preferred Embodiments

I. Introduction and Environment

Figure 1:
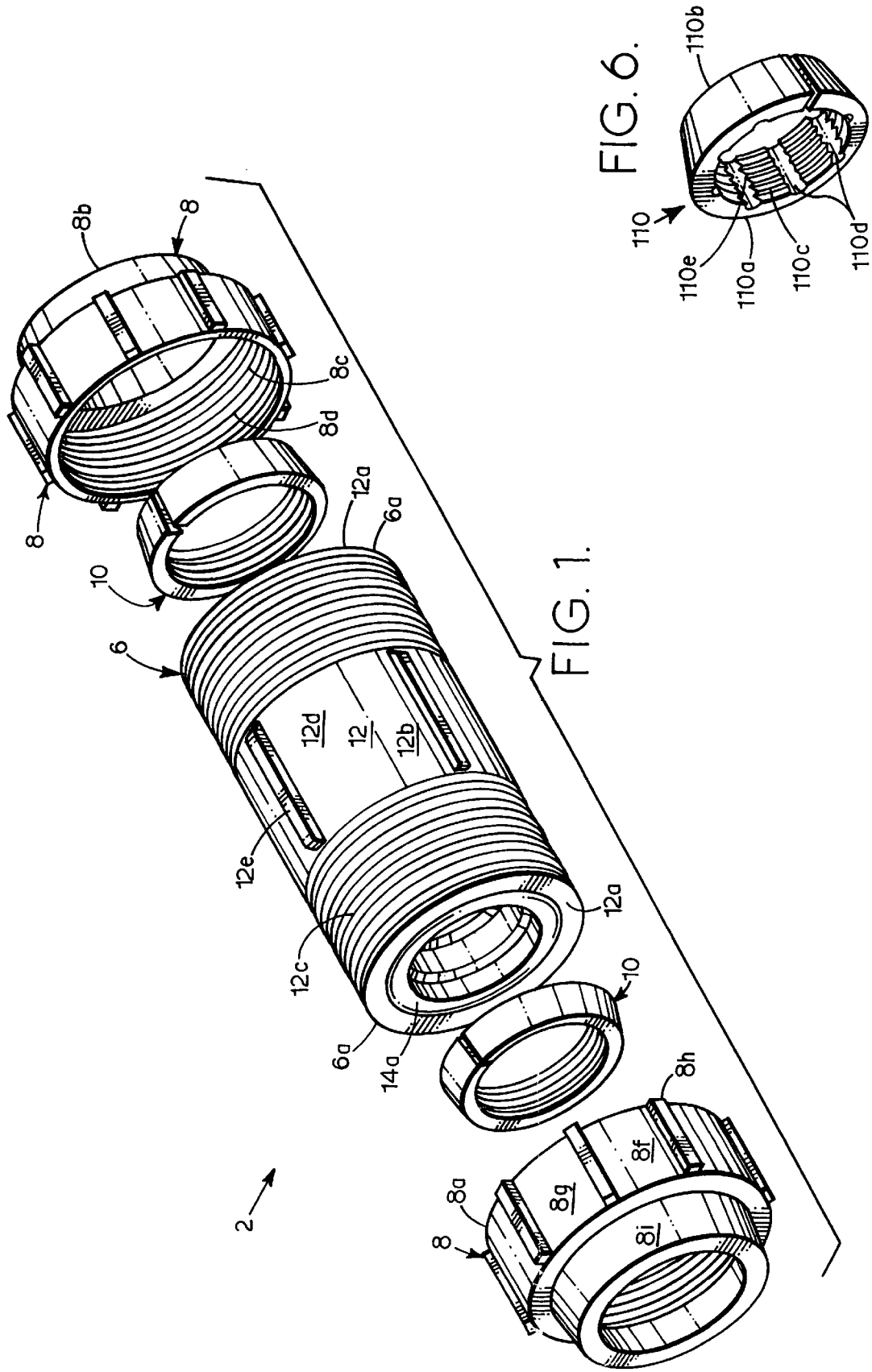
FIG. 1 is a perspective view of a conduit coupling embodying the present invention.
Figure 2:
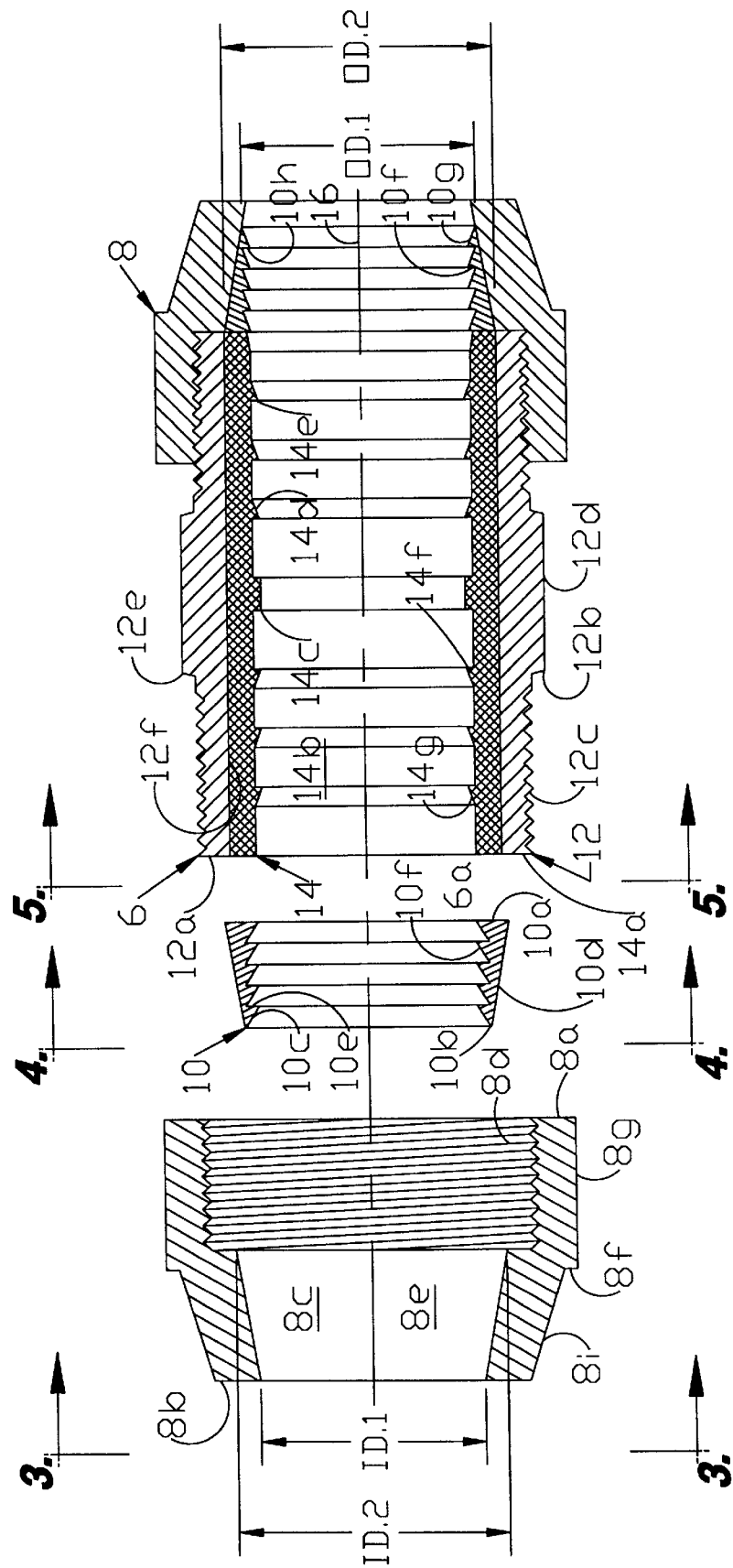
FIG. 2 is an enlarged, longitudinal, cross-sectional view thereof.
Figure 5:
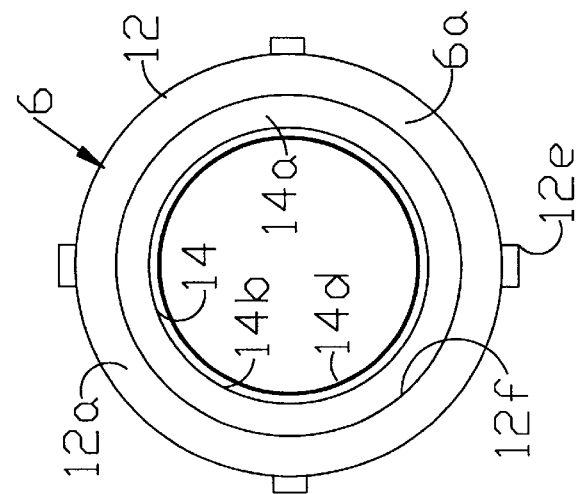
FIG. 5 is an end elevational view of a body thereof.
Figure 4:
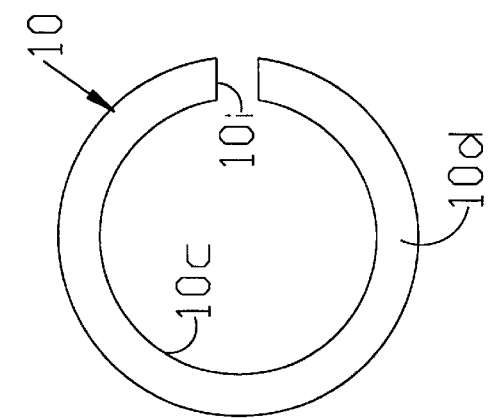
FIG. 4 is an end elevational view of a gripper ring thereof.
Figure 3:
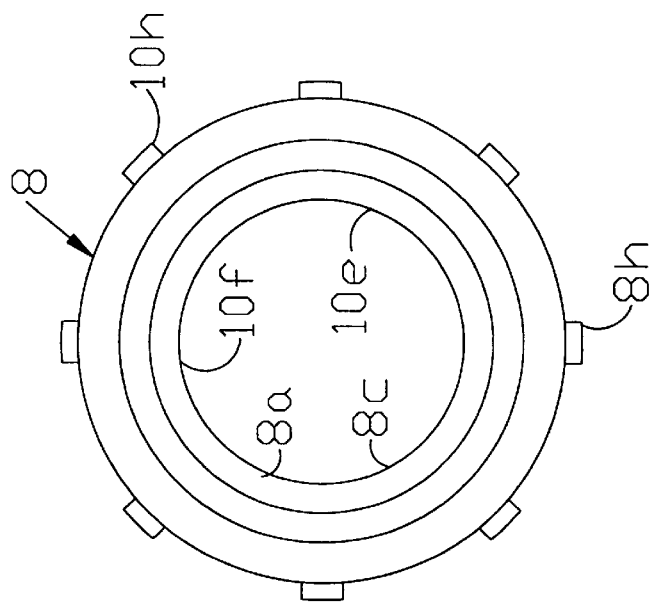
FIG. 3 is an end elevational view of a lock nut thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a conduit coupling for conduit sections 4 each having an end 4a. Without limitation on the generality of useful applications of the coupling 2, it is particularly well suited for fluid-tight applications. For example, fiber optic cables and other communications lines are commonly run through buried conduits. High density polyethylene (HDPE) material is commonly used for the buried conduits, sections of which can be joined by the coupling 2. However, the coupling 2 could also be utilized with other materials and in other applications.

The conduit coupling 2 generally comprises a body 6, a lock nut 8 and a gripper ring 10.

II. Body 6

The body 6 includes an external casing 12 with opposite ends 12a, an outer surface 12b, external threading 12c adjacent the ends 12a, and a medial section 12d between the external threading 12c. A plurality of longitudinally-extending, radially-spaced grips 12e protrude outwardly from the casing outer surface 12b. A casing bore 12f extends between the casing ends 12a. The casing 12 preferably comprises a relatively rigid material, such as polyvinylchloride (PVC).

A core 14 is fixedly secured within the casing bore 12f and includes opposite ends 14a which are generally flush with the casing ends 12a and thus form respective body ends 6a. The core 14 includes a passage 14b between and open at the core ends 14a. A medial, annular stop ring or lip 14c projects inwardly into the core passage 14b approximately midway between the core ends 14a.

A plurality of annular, sawtooth-shaped ridges 14d are positioned in generally parallel, spaced relation on each side of the stop ring or lip 14c and project inwardly into the core passage 14b. Each ridge 14d includes an annular edge 14e formed by the intersection of a proximate face 14f lying generally in a plane perpendicular to a longitudinal axis 16 and a distal face 14g which slopes proximally and inwardly to the ridge edge 14e. The core 14 preferably comprises a suitable elastomeric material, such as urethane.

III. Lock Nut 8

The lock nut 8 includes proximate and distal ends 8a,b and a lock nut passage 8c extending between and open at the ends 8a,b. The passage 8c includes an internally threaded proximate section 8d and a frusto-conical, distally converging distal section 8e. The lock nut passage 8c includes a proximate inside diameter ID.1 and a lesser, distal inside diameter ID.2. The lock nut passage proximate and distal sections 8d,e are open at the lock nut proximate and distal end 8a,b respectively.

The lock nut 8 includes an outer surface 8f with a generally cylindrical proximate portion 8g having a plurality of grips 8h projecting outwardly therefrom and a frusto-conical, distally-converging outer surface distal portion 8i terminating at the lock nut distal end 8b.

IV. Gripper Ring 10

The gripper ring 10 includes proximate and distal ends 10a,b and a gripper ring passage 10c extending therebetween and open thereat. The gripper ring 10 has a frusto-conical, distally-converging outer surface 10d. The gripper ring 10 includes a proximate outside diameter OD.1 and a lesser, distal outside diameter OD.2. A plurality of annular ridges project inwardly into the gripper ring passage 10c and each includes an annular edge 10f. The gripper ring ridges 10e have configurations similar to the body core ridges 14d with proximate faces 10g generally perpendicular to the longitudinal axis 16 and distal faces 10h sloping inwardly and proximally from the ring passage 10c to the respective ridge edges 10f. The gripper ring 10 includes an expansion/contraction slot 10i extending between its ends 10a,b and open at the passage 10c and the outer surface 10d.

V. Modified Gripper Ring 110

A modified gripper ring 110 is shown in FIG. 6 and includes proximate and distal ends 110a,b and a passage 110c extending therebetween. A plurality of channels 110d extend longitudinally between the longitudinal gripper ring ends 110a,b and open into the passage 110c. The channels 110d are positioned in radially-spaced relation. The modified gripper ring 110 includes a plurality of ridges 110e which extend between respective adjacent pairs of channels 110d and have cross-sectional configurations similar to the ridges 10e. The channels 110d facilitate manufacture of the gripper ring 110 by reducing the amount of material required, and are particularly useful in connection with modified gripper rings 110 having relatively small-diameter passages 110c.

VI. Assembly and Operation

Figure 7A:
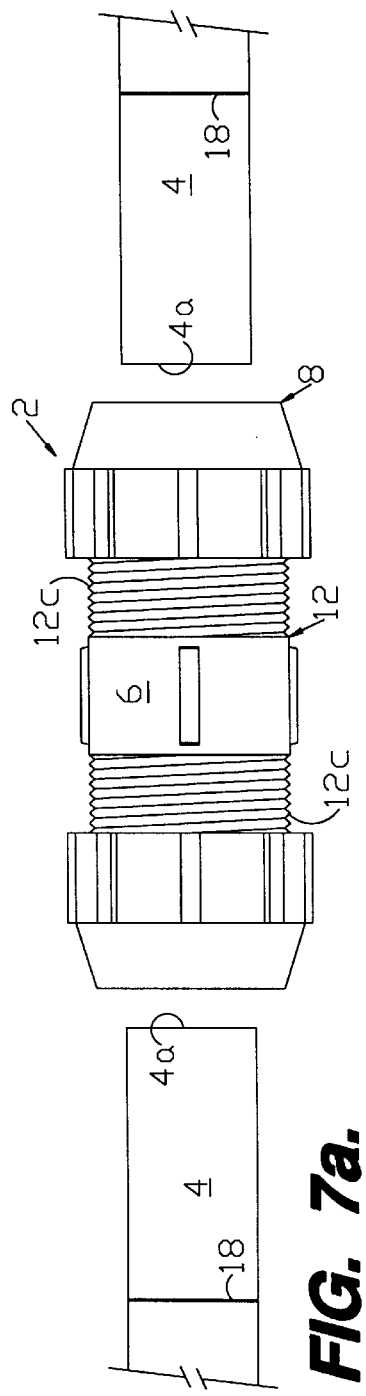
FIG. 7a is a side elevational view of the conduit coupling showing a first step of a first assembly procedure.
Figure 7B:
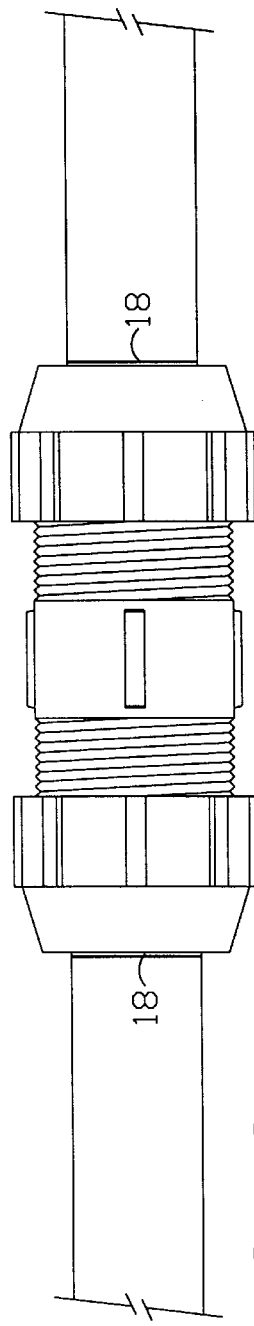
FIG. 7b is a side elevational view of the conduit coupling showing a second step of the first assembly procedure.
Figure 7C:
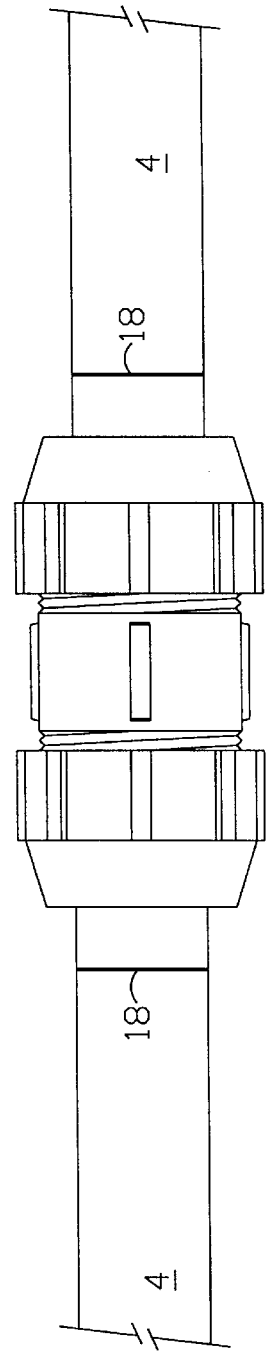
FIG. 7c is a side elevational view of the conduit coupling showing a third step of the first assembly procedure.

A first assembly method is shown in FIGS. 7a,b,c and involves the following steps:

1. The lock nuts 8 are loosened on the body 6 until a predetermined length (e.g., approximately one inch) of external threading 12c is exposed on each side.
2. An annular mark 18 is placed on each conduit section 4 a predetermined distance from its end 4a. For example, the marks 18 can be located approximately 3½ inches from the ends 4a for mounting a typical conduit coupling 2.
3. The conduit section ends 4a are pushed into the lock nuts 8, through the gripper rings and into engagement with the core lip or stop ring 14c on either side.
4. The lock nuts 8 are then tightened. For example, a relatively secure application can be formed by tightening the lock nuts 8 by hand, and then tightening each of them one additional revolution with the aid of an appropriate wrench or other tool.

Figure 8A:
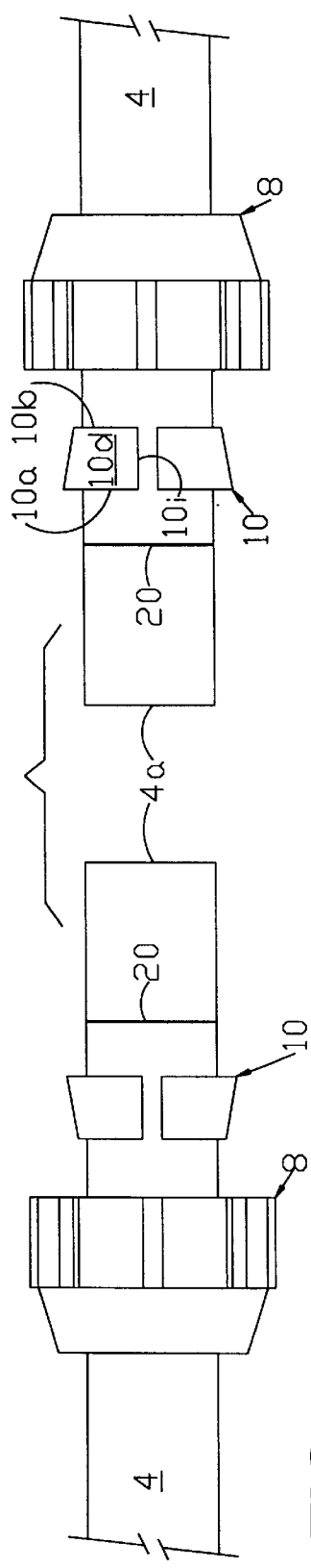
FIG. 8a is a side elevational view of the conduit coupling showing a first step of a second assembly procedure.
Figure 8B:
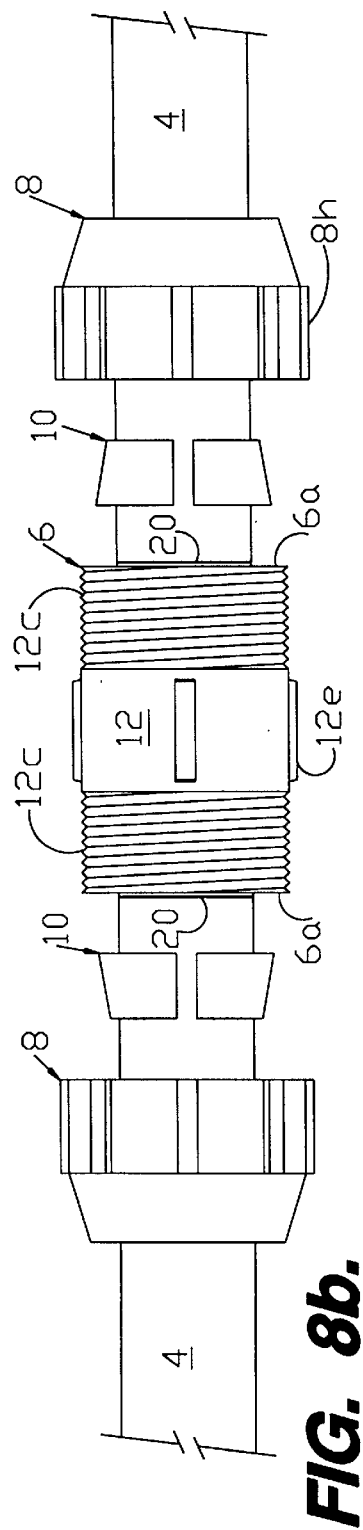
FIG. 8b is a side elevational view of the conduit coupling showing a second step of the second assembly procedure.
Figure 8C:
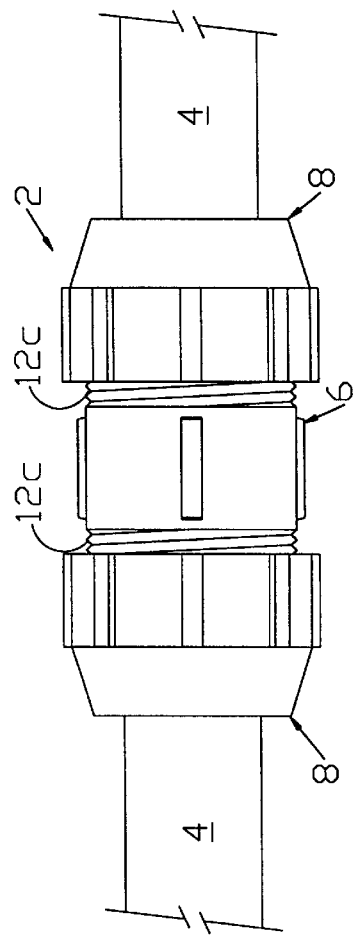
FIG. 8c is a side elevational view of the conduit coupling showing a third step of the second assembly procedure.

FIGS. 8a,b,c illustrate an alternative installation method involving the following steps:

1. The lock nuts 8 and the gripper rings 10 are slid over the conduit sections 4 and positioned in spaced relation from their respective ends 4a.
2. Annular marks 20 are then placed on each conduit section 4, for example, approximately two inches from their respective ends 4a.
3. Each conduit end 4a is then pushed into a respective body end 6a and into engagement with a respective side of the core lip or stop ring 14c.
4. The gripper rings 10 are then pushed proximally until their respective proximate ends 10a engage the body ends 6a.
5. The lock nuts 8 are then hand-tightened, and receive one additional revolution each applied mechanically to effect a secure coupling.

In operation, a relatively tight coupling engagement is formed between the conduit sections 4 and the conduit coupling 2. The sawtooth configurations of the core ridges 14d and the gripper ring ridges 10e cooperate to effectively resist pull-out of the conduit sections 4.

It is to be understood that while certain forms of the present invention have been illustrated and described herein, it is not to be limited to the specific forms or arrangement of parts described and shown. For example, the coupling 2 could be reconfigured for connecting a single conduit section 4 to another type of fitting or to a piece of equipment or other component in a system. Other fitting configurations could also be formed, such as T-connectors, Y-connectors, four-way connectors, etc.

What is claimed and desired to be secured by Letters Patent is as follows:

1. A coupling for a conduit section with a conduit section end, which includes:
   (a) a longitudinal axis;
   (b) a body including:
      (1) an outer casing;
      (2) an elastomeric core received within said casing;
      (3) an open end;
      (4) a core passage within said core receiving the conduit and terminating at said body open end;
      (5) said core having annular sealing means for forming an annular seal with the conduit; and
      (6) external threading on the casing adjacent the body end;
   (c) a lock nut including:
      (1) a proximate end;
      (2) a distal end;
      (3) a lock nut passage extending between and open at said lock nut ends, said lock nut passage having an internally-threaded proximate section adjacent said lock nut proximate end and a distal section converging distally from said passage proximate section to said lock nut distal end; and
      (4) said lock nut passage having a proximate diameter adjacent its proximate end and a reduced, distal diameter adjacent its distal end;
   (d) a gripper ring including:
      (1) a generally frusto-conical gripper ring outer surface with a configuration corresponding to the configuration of the lock nut passage converging distal section;
      (2) a proximate end with a first diameter;
      (3) a distal end with a second diameter less than said first diameter;
      (4) a gripper ring passage extending between and open at said gripper ring ends; and
      (5) gripping means within said gripper ring passage for gripping said conduit; and
   (e) gripper ring slip means for axially slipping said gripper ring with respect to said lock nut for adjusting said gripper ring passage diameter.

2. The conduit coupling of claim 1, which includes:
   (a) said slip means comprising a sliding connection between said lock nut passage distal section and said gripper ring outer surface.

3. The conduit coupling of claim 2 wherein said gripper ring includes a diameter control slot which expands and contracts respectively as said lock nut advances proximally and distally with respect to said gripper ring.

4. The conduit coupling of claim 1 wherein said annular sealing means comprises a plurality of annular ridges positioned in longitudinally-spaced relation in said core passage.

5. The conduit coupling of claim 4 wherein each said core ridge includes:
   (a) an annular edge;
   (b) a proximate face located substantially within a plane perpendicular to the conduit coupling longitudinal axis; and
   (c) a distal face sloping inwardly and proximally from said core passage to said ridge edge.

6. The conduit coupling of claim 1 wherein said core includes an annular stop ring projecting into said body passage and positioned proximally from said annular ridges.

7. The conduit coupling of claim 1 wherein said gripper ring gripping means comprises an annular gripper ring ridge including:
   (a) an annular edge;
   (b) a proximate face located substantially within a plane perpendicular to the conduit coupling longitudinal axis; and
   (c) a distal face sloping inwardly and proximally from said gripper ring passage to said ridge edge.

8. The conduit coupling of claim 1 wherein said gripper ring includes:
   (a) a plurality of channels positioned in radially-spaced relation around said gripper ring passage and extending between said gripper ring proximate and distal ends.

9. The conduit coupling of claim 1 wherein said casing includes an outer surface and a plurality of radially-spaced grips projecting outwardly from said casing outer surface and positioned proximally from said external threading.

10. The conduit coupling of claim 1 wherein said lock nut includes a lock nut outer surface and a plurality of radially-spaced grips projecting outwardly from said lock nut outer surface.

11. A coupling for conduit sections each having a conduit section end, which includes:
   (a) a longitudinal axis;
   (b) a body including:
      (1) opposite body ends;
      (2) an outer casing with a casing outer surface and opposite casing ends at said body ends respectively;
      (3) external threading on said casing outer surface adjacent said casing ends;
      (4) said casing having a medial section with a plurality of longitudinally-extending, radially-spaced grips protruding outwardly from the casing outer surface;
      (5) said casing having a casing bore extending between and open at said casing ends;
      (6) a core comprising an elastomeric, resilient material;
      (7) said core having opposite core ends generally flush with said body casing ends respectively and located at said body ends respectively;
      (8) a core passage extending between and open at said core ends;
      (9) an annular stop ring located medially between said core ends and extending into said core passage; and
      (10) a plurality of annular core ridges located on each side of said stop ring in said core passage, each said core ridge including an annular inner edge, a proximate face lying generally within a plane perpendicular to said longitudinal axis of the conduit coupling and a distal face sloping inwardly and proximally to said core ridge edge, each said core ridge being oriented with its respective proximate face towards said stop ring and its distal face towards a respective core end;
   (c) a lock nut including:
      (1) a proximate end;
      (2) a distal end;

(3) a lock nut passage extending between and open at said lock nut ends, said lock nut passage having an internally-threaded proximate section adjacent said lock nut proximate end and a distal section converging distally from said passage proximate section to said lock nut distal end;

(4) said lock nut passage having a proximate inside diameter adjacent its proximate end and a reduced, distal inside diameter adjacent its distal end;

(5) a lock nut outer surface; and (6) a plurality of longitudinally-extending, radially-spaced grips projecting outwardly from said lock nut outer surface; and (d) a gripper ring including:

(1) a generally frusto-conical gripper ring outer surface with a configuration corresponding to the configuration of the lock nut passage converging distal section;

(2) a proximate end with a first outside diameter;

(3) a distal end with a second outside diameter less than said first outside diameter;

(4) a gripper ring passage extending between and open at said gripper ring ends;

(5) a plurality of annular gripper ring ridges located in said gripper ring passage, each said gripper ring ridge including an annular inner edge, a proximate face lying generally within a plane perpendicular to said longitudinal axis of the conduit coupling and a distal face sloping inwardly and proximally to said gripper ring ridge edge, each said gripper ring ridge being oriented with its proximate face towards said gripper ring proximate end and its distal face towards said gripper ring distal end;

(6) a diameter control slot in said gripper ring extending between its ends and between its outer surface and said gripper ring passage; and (7) said gripper ring being axially slidably received in said lock nut passage distal section and said gripper ring passage expanding and contracting respectively as said lock nut slides distally and proximally with respect to said gripper ring.

12. The conduit coupling of claim 11 wherein said gripper ring includes:

(a) a plurality of channels positioned in radially-spaced relation around said gripper ring passage and extending between said gripper proximate and distal ends.

* * * * *

UNITED STATES PATENT AND TRADEMARK OFFICE
CERTIFICATE OF CORRECTION

PATENT NO. : 5,833,276
DATED : Nov. 10, 1998
INVENTOR(S) : Ernest R. Thompson JR.

It is certified that error appears in the above-identified patent and that said Letters Patent is hereby corrected as shown below:

Title page, item [54] and column 1, line 1, change "DOUPLING" to --COUPLING--

Signed and Sealed this

Ninth Day of November, 1999

Attest:

Q. TODD DICKINSON

Attesting Officer

Acting Commissioner of Patents and Trademarks